(12) United States Patent
Payne

(10) Patent No.: US 10,577,047 B2
(45) Date of Patent: Mar. 3, 2020

(54) REM-AM (RARE EARTH MAGNET-ALL MOUNTAIN) PEDAL ASSEMBLY

(71) Applicant: Craig Payne, Crowley, TX (US)

(72) Inventor: Craig Payne, Crowley, TX (US)

( * ) Notice: Subject to any disclaimer, the term of this patent is extended or adjusted under 35 U.S.C. 154(b) by 0 days.

(21) Appl. No.: 15/592,986

(22) Filed: May 11, 2017

(65) Prior Publication Data
US 2018/0327049 A1 Nov. 15, 2018

(51) Int. Cl.
B62M 3/08 (2006.01)

(52) U.S. Cl.
CPC .................... B62M 3/086 (2013.01)

(58) Field of Classification Search
CPC .......... B62M 3/00; B62M 3/003; B62M 3/02; B62M 3/04; B62M 3/08; B62M 3/083; B62M 3/086; B62M 9/12; B62M 9/124; B62M 9/125; Y10T 74/2164; Y10T 74/2165; Y10T 74/2167; Y10T 74/2168; Y10T 74/217
See application file for complete search history.

(56) References Cited

U.S. PATENT DOCUMENTS

| 5,473,963 | A | * | 12/1995 | Aeschbach | .......... | A43B 1/0054 36/131 |
| 9,545,972 | B2 | | 1/2017 | Williams | | |
| 2005/0102802 | A1 | * | 5/2005 | Sitbon | ...................... | A41F 1/002 24/303 |
| 2016/0137274 | A1 | | 5/2016 | Peterson | | |

FOREIGN PATENT DOCUMENTS

| EP | 1972221 A2 * | 9/2008 | ........... A43B 1/0054 |
| JP | 03243488 A * | 10/1991 | ........... A43B 1/0054 |

OTHER PUBLICATIONS

Machine Translation of JP 03243488, obtained Jul. 7, 2018.*

* cited by examiner

Primary Examiner — Richard W Ridley
Assistant Examiner — Brian J McGovern
(74) Attorney, Agent, or Firm — Holland & Hart LLP

(57) ABSTRACT

A magnetic mountain bike pedal assembly provides for at least one pedal having a center member, the center member having at least one magnet in its center portion, a plate adapted to be removedly attached to a shoe wherein the plate contains at least one magnet, wherein when the plate and the center member are aligned a disconnectable magnetic connection is formed. In some embodiments, either the first magnetic element or the second magnetic element, or both may be Neodymium, and in some embodiments they may be axially-magnetized Neodymium. In some embodiments the present invention may also provide a shoe attached to the plate, the shoe having at least one ferrous metal cleat.

18 Claims, 9 Drawing Sheets

REM-AM (RARE EARTH MAGNET-ALL MOUNTAIN) PEDAL ASSEMBLY

TECHNICAL FIELD

The present invention relates generally to the field of bicycle pedals and more specifically relates to a magnetic mountain bike pedal assembly.

BACKGROUND

Many mountain bicycle riders are passionate about the mountain bicycle riding experience. They pay attention to the functioning of each piece and want to use the best equipment possible. For many such persons, the pedal is of paramount concern. Because the pedal is one of the points of connection between the ride and the mountain bike, the right or wrong pedal can change how the rider interacts with both the bicycle and the trail. Whether the rider is going off a jump, pedaling hard, or coasting along, the pedal, together with the grips and the seat, are one of the most important points of connection on a mountain bike. And, the choice of pedal can also have long term effects on a rider's knees, back, and feet.

Consequently, mountain bike pedal design is of great importance. Typically, there are two categories of mountain bike pedals: "flats" where the user's foot simply presses against the pedal, or "clipless," which despite the name refers to a pedal wherein a shoe can removably clip to the pedal for added connection. Many serious riders prefer the constant connection provided by clipless pedals, but others prefer the freedom of flats. Indeed, persons with bad knees may prefer flats so they can better control the movement of their knees.

The problem with clipless pedals is intertwined with their benefit: it is cumbersome or difficult to disconnect the shoe from the pedal. So it can be seen that a need exists for a pedal with the control and connection of the clipless pedal, but that also provides the freedom and natural movement of the flat pedal.

Various attempts to solve this problem have been made. One such attempt can be seen with respect to U.S. Pat. No. 5,473,963, incorporated by reference in its entirety herein, which generally discloses a magnetic bicycle pedal using six Neodymium Iron Boron (NdFeB) magnets in the pedal. While this disclosure does generally provide for a magnetic pedal, it not only requires Neodymium Iron Boron (NdFeB), rather than simply Neodymium, it also requires at least six such magnets in a coordinated arrangement, which could presumably be easily damaged and rendered nonfunctional in harsh conditions.

Another attempt can be seen with respect to U.S. Pat. No. 9,545,972, incorporated by reference in its entirety herein, which generally discloses a magnetic mountain bike pedal. While this disclosure does provide for a single Neodymium magnet in each of the pedal and the shoe elements of the disclosure, this disclosure fails to provide for zinc or stainless steel protective plating for the magnets (providing only for steel plating), which changes the magnets' protection, in some ways possibly for the worse.

Yet another attempt can be seen with respect to U.S. Patent Application Publication No. 2016/0137274 A1 incorporated by reference in its entirety herein, which generally discloses another magnetic shoe/pedal device having an angled cylinder element on the shoe that may be received into the pedal. While theoretically enabling magnetic joining and unjoining, the design of the cylinder element not only makes this disclosure more likely to be damaged, walking on such a device may also affect the user's musculature.

Various attempts have been made to solve the problems which may be found in the related art but have thus far been unsuccessful. A need exists for a new magnetic mountain bike pedal assembly to avoid the above-mentioned problems.

SUMMARY OF THE INVENTION

It is to be understood that in the present disclosure, all embodiments are provided as illustrative and non-limiting representatives of many possible embodiments. In addition, the terms "is," "can," "will," and the like are herein used as synonyms for and interchangeable with terms such as "may," "may provide for," and "it is contemplated that the present invention may" and so forth.

The present invention relates to a magnetic mountain bike pedal that overcomes the deficiencies of the prior art. It is contemplated that the present invention may provide a magnetic mountain bike pedal assembly that enables rapid and secure attachment and unattachment as between a shoe and a mountain bicycle pedal.

For purposes of summarizing, certain aspects, advantages, and novel features of the present invention are provided herein. It is to be understood that not all such aspects, advantages, or novel features may be provided in any one particular embodiment. Thus, the disclosed subject matter may be embodied or carried out in a manner that achieves or optimizes one aspect, advantage, or novel feature or group of features without achieving all aspects, advantages, or novel features as may be taught or suggested.

In view of the foregoing disadvantages inherent in the known art, the present invention provides a novel magnetic mountain bike pedal assembly. The general purpose of the present invention, which will be described subsequently in greater detail, is to provide a mountain bike pedal with a magnetic element, which may preferably be composed of at least one element of Neodymium in isolation or in combination with one or more other elements, located either in a mountain bike pedal, a shoe, or both.

In one embodiment, the present invention may provide for a binding system for a shoe to a pedal. The magnetic center of the pedal allows the shoe to maintain constant contact with the pedal. More specifically, the present invention's pedal element(s) use at least one, in some embodiments two, Neodymium magnets that may be axially magnetized. They are magnetized through the length or thickness of the pedal which are the strongest points of the flat faces. The magnets are incorporated into at least one stainless steel shell in the center of the pedal. There is a spindle going through the center of the stainless steel shell holding it in the center of the pedal but also allowing it to float. By allowing the magnet housing to float, it maintains better connection between shoe and pedal. It also the geometry of the knees to operate in a much more natural motion with less stress being put them than may be disclosed in the prior art. There is also a stainless steel wall or floor between magnet 'A' and magnet 'B'. The stainless steel shell creates a cup around each magnet that absorbs the magnetic field on one side and forces it toward the opposite direction. This creates a double pull at one end of each magnet. The stainless steel shell doubles as a very tough layer of protection from harsh environments. Zinc (Zn) plating may be used to protect the exposed magnet faces. The magnetic pull that is created by the neodymium magnets is attracted to a ferrous metal cleat (approx. 35 mm×50 mm) that attaches to the sole of a mountain bike shoe that is fitted with, by way of illustration and not limitation, the SPD system. This system creates and maintains a better contact between shoe and pedal while allowing the rider to wear a flat shoe. Axially magnetized neodymium magnets' strongest pull come from north and south poles. So, by moving the heal of the shoe east or west, or in some embodiments any direction laterally, decreases the pull and enables the shoe to release from the magnet. The foregoing is but one of many examples of how the present invention's shoe element may be disengaged from the present invention's pedal element.

The contemplated benefits of the present invention include the fat that using the Neodymium magnetics as a binding system may give riders more freedom without being locked in, while still able to pull up on the pedal for efficiency. It also may allow more "float" than the traditional clipless pedal, which in some embodiments may allow for a more natural movement and less stress on the user's knees. Lastly, the action of locking into and disconnecting from the pedal may be much easier and user-friendly with the present invention than with a traditional clipless pedal. One example of many in which this may be desirous is if and when a user finds the trail to be difficult, the user can disconnect the user's feet from the pedal with much more ease than with the traditional clipless pedal. This allows much more confidence which, it is contemplated, provides users with a much more joyful ride.

It is also contemplated that the present invention, including without limitation the present invention's neodymium magnetic platform pedal elements, encompasses the best attributes of the 'clipless' and 'flat' pedal and creates a pedal that is in the middle. By doing this, it allows the rider to ride with more confidence and less wear and tear on the body.

Additionally, the present invention can provide value to users who ride bikes indoors, such as spin bikes in gyms. With the present invention, users can wear workout shoes to the gym and not need to carry extra clipless specific shoes that are not general-walking or workout friendly, due to their hard slippery soles. Users can also derive benefit from the present invention in any circumstance where persons ride bicycles, such as for those who ride bicycles as part of their commute to work or when they are running general errands. Additionally, BMX bike riders can greatly appreciate the use of this kind of pedal, as well as users of road bikes.

BRIEF DESCRIPTION OF THE DRAWINGS

These and other features, aspects and advantages of the present invention will become better understood with regard to the following description, appended claims, and accompanying figures where:

DETAILED DESCRIPTION

The present invention overcomes the limitations of the prior art by providing a new and more effective magnetic mountain bike pedal assembly.

All dimensions specified in this disclosure are by way of example only and are not intended to be limiting. Further, the proportions shown in these Figures are not necessarily to scale. As will be understood by those with skill in the art with reference to this disclosure, the actual dimensions and proportions of any embodiment or element of an embodiment disclosed in this disclosure will be determined by its intended use.

It is to be understood that the drawings and the associated descriptions are provided to illustrate potential embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

Throughout the drawings, reference numbers are re-used to indicate correspondence between referenced elements. In addition, the first digit of each reference number indicates the figure where the element first appears.

As used in this disclosure, except where the context requires otherwise, the term "comprise" and variations of the term, such as "comprising", "comprises" and "comprised" are not intended to exclude other additives, components, integers or steps.

In the following description, specific details are given to provide a thorough understanding of the embodiments. However, it will be understood by one of ordinary skill in the art that the embodiments may be practiced without these specific detail. Well known features, elements or techniques may not be shown in detail in order not to obscure the embodiments.

Figure 1:
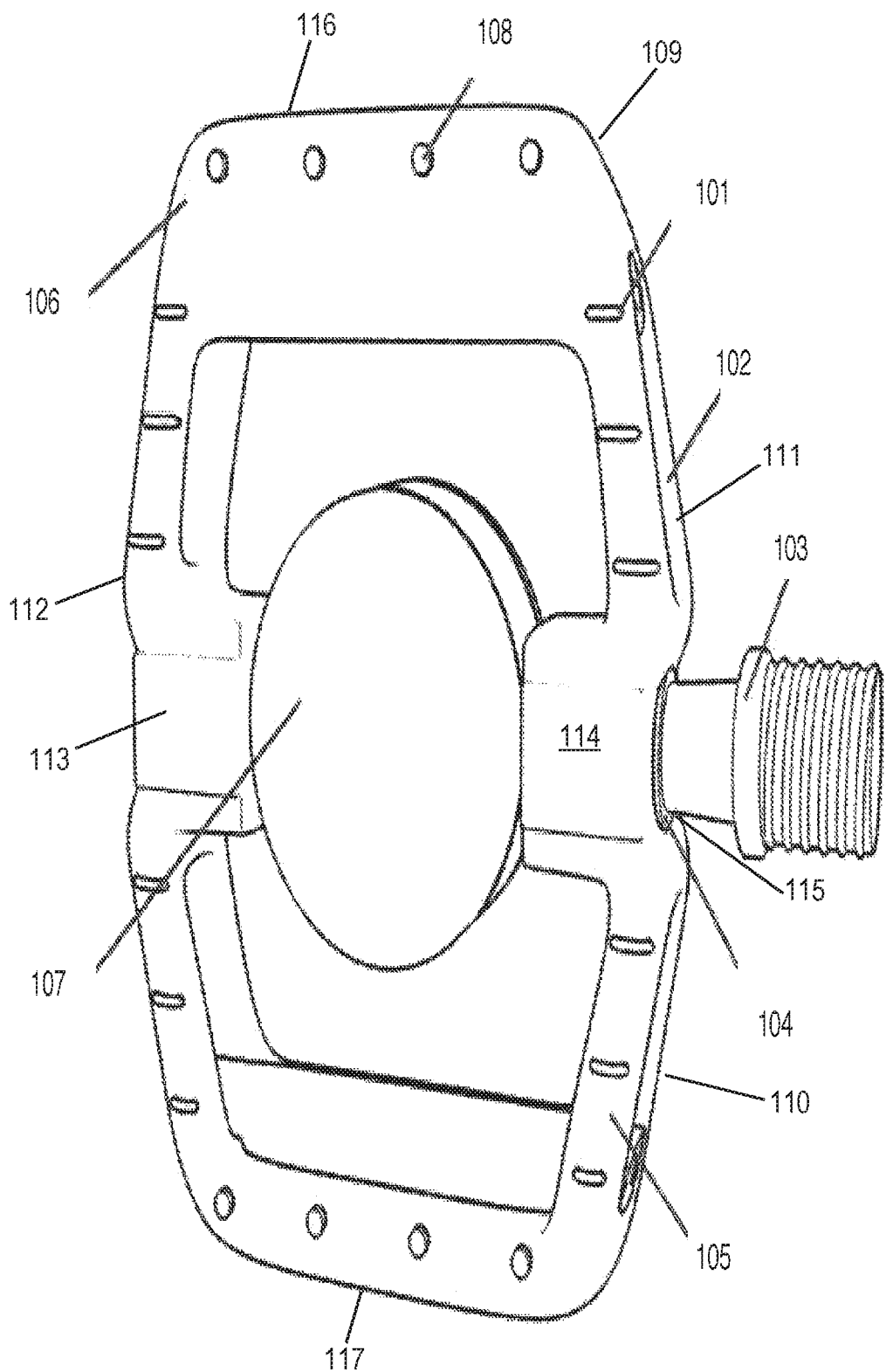
FIG. 1 shows a side perspective view of a magnetic mountain bike pedal assembly in accordance with one embodiment of the invention.

Turning attention to FIG. 1, a side perspective view of a magnetic mountain bike pedal assembly in accordance with one embodiment of the invention is shown. In the embodiment depicted, a viewer may perceive ribs 101, chamfered edges 102, spindle 103, external seal 104, concave platform 105, aluminum body 106, Neodymium magnet 107, adjustable pins 108, a front end 116, and a rear end 117.

Figure 2:
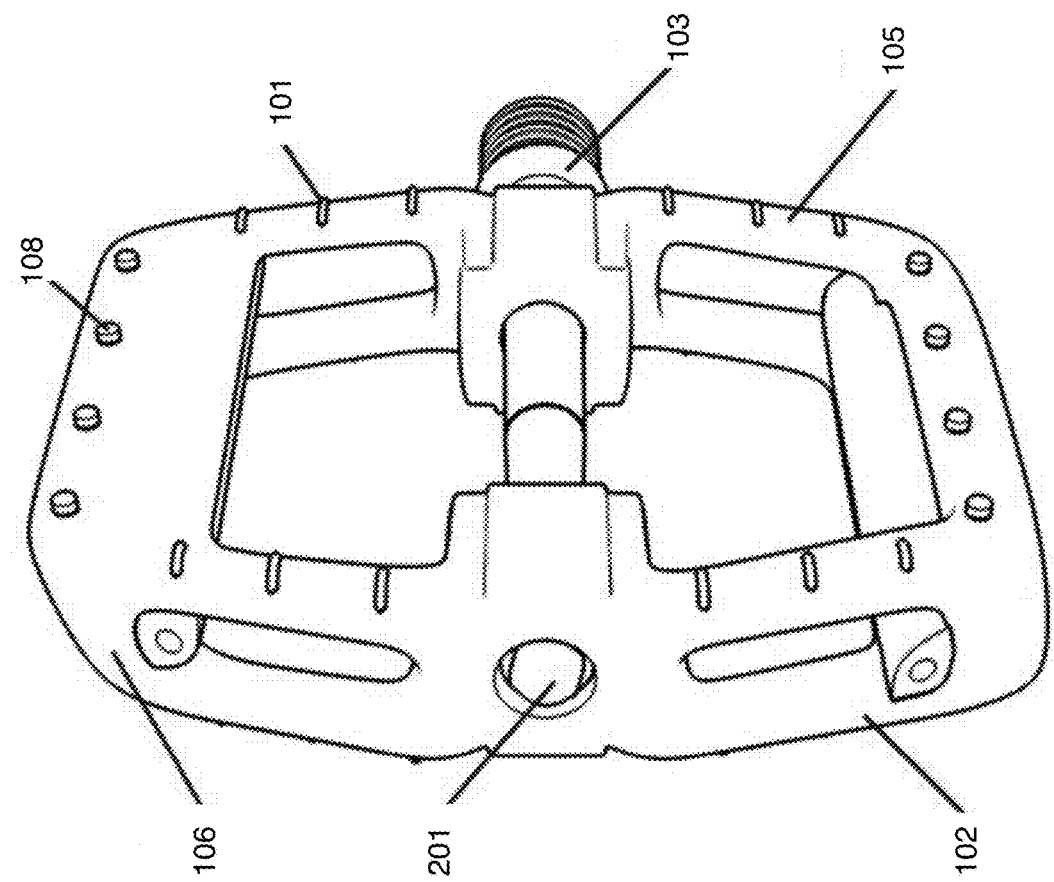
FIG. 2 shows a first end-side perspective view of a magnetic mountain bike pedal assembly in accordance with one embodiment of the invention.

Turning attention to FIG. 2, a first end-side perspective view of a magnetic mountain bike pedal assembly in accordance with one embodiment of the invention is shown. In the embodiment depicted, a viewer may perceive hex alloy cad 201, in addition to ribs 101, chamfered edges 102, spindle 103, concave platform 105, aluminum body 106, and adjustable pins 108.

Figure 3:
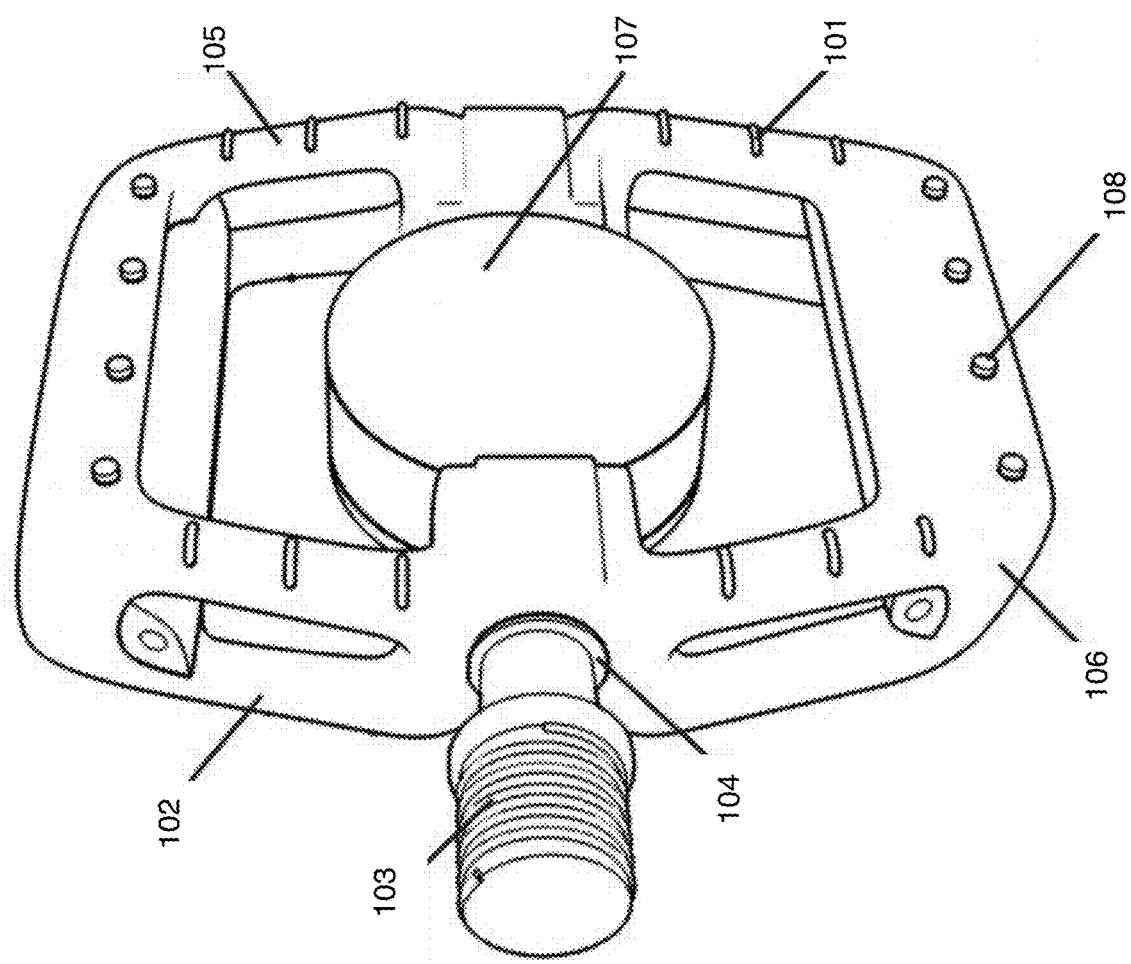
FIG. 3 shows a second-end perspective view of a magnetic mountain bike pedal assembly in accordance with one embodiment of the invention.

Turning attention to FIG. 3, a second-end perspective view of a magnetic mountain bike pedal assembly in accordance with one embodiment of the invention is shown. In the embodiment depicted, a viewer may perceive an alternate rendering of ribs 101, chamfered edges 102, spindle 103, external seal 104, concave platform 105, aluminum body 106, Neodymium magnet 107, and adjustable pins 108.

Figure 4:
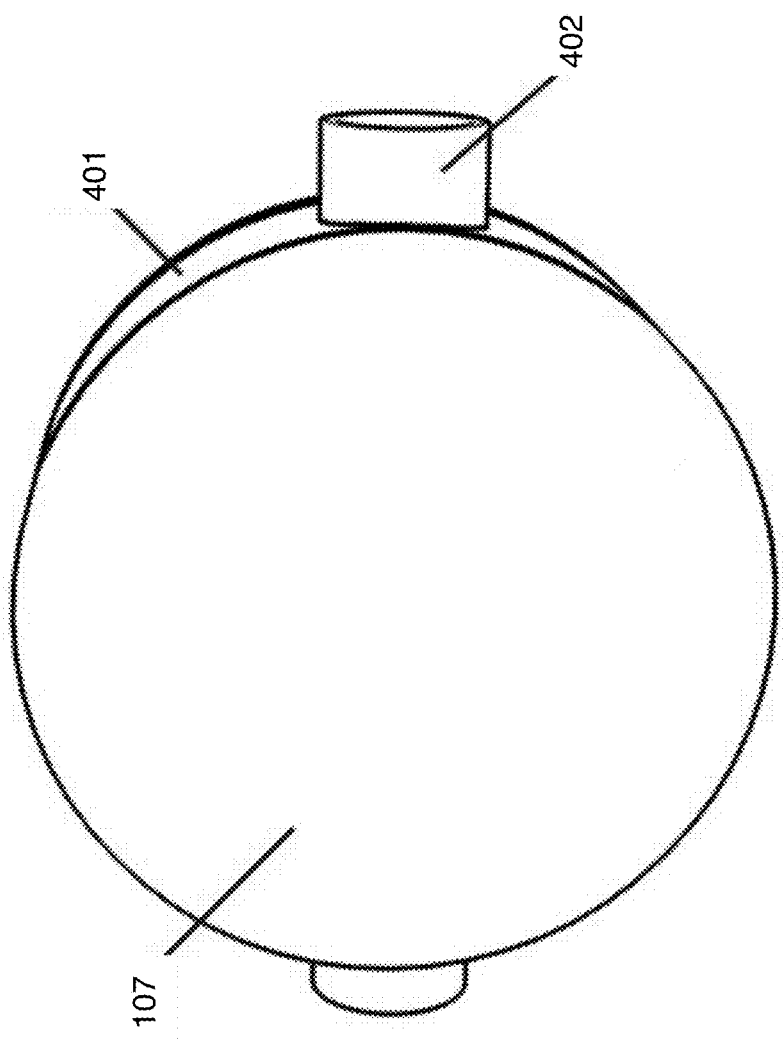
FIG. 4 shows a top-perspective view of a magnetic element for use with a mountain bike pedal assembly in accordance with one embodiment of the invention.

Turning attention to FIG. 4, a top-perspective view of a magnetic mountain bike pedal assembly in accordance with one embodiment of the invention is shown. In the embodiment depicted, a viewer may perceive stainless steel housing 401 and spindle housing 402, along with Neodymium magnet 107.

Figure 5:
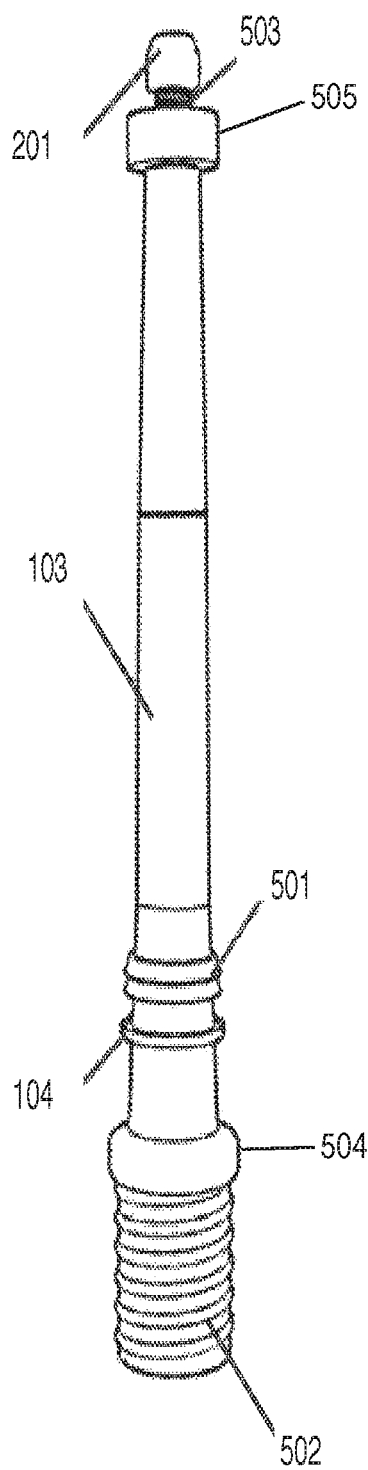
FIG. 5 shows a planar view of an element of a magnetic mountain bike pedal assembly in accordance with one embodiment of the invention.

Turning attention to FIG. 5, a planar view of an element of a magnetic mountain bike pedal assembly in accordance with one embodiment of the invention is shown. In the embodiment depicted, a viewer may perceive internal seal 501, grooves 502, and sealed bearing 503, along with hex alloy cad 201, spindle 103, and external seal 104.

Figure 6:
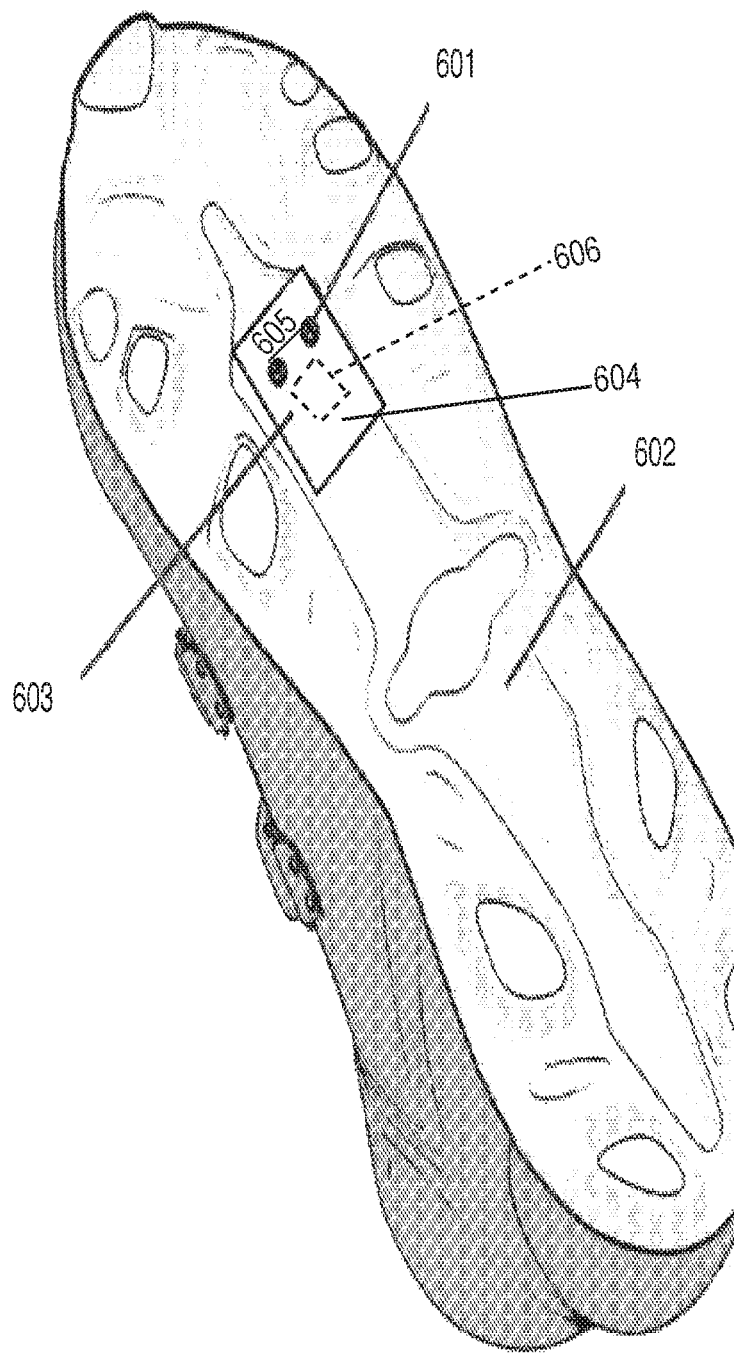
FIG. 6 shows a bottom-perspective view of an element of a magnetic mountain bike pedal assembly in accordance with one embodiment of the invention.

Turning attention to FIG. 6, a bottom-perspective view of an element of a magnetic mountain bike pedal assembly in accordance with one embodiment of the invention is shown. In the embodiment depicted, a viewer may perceive screws 601, bottom of shoe 602, and steel cleat 603.

Figure 7:
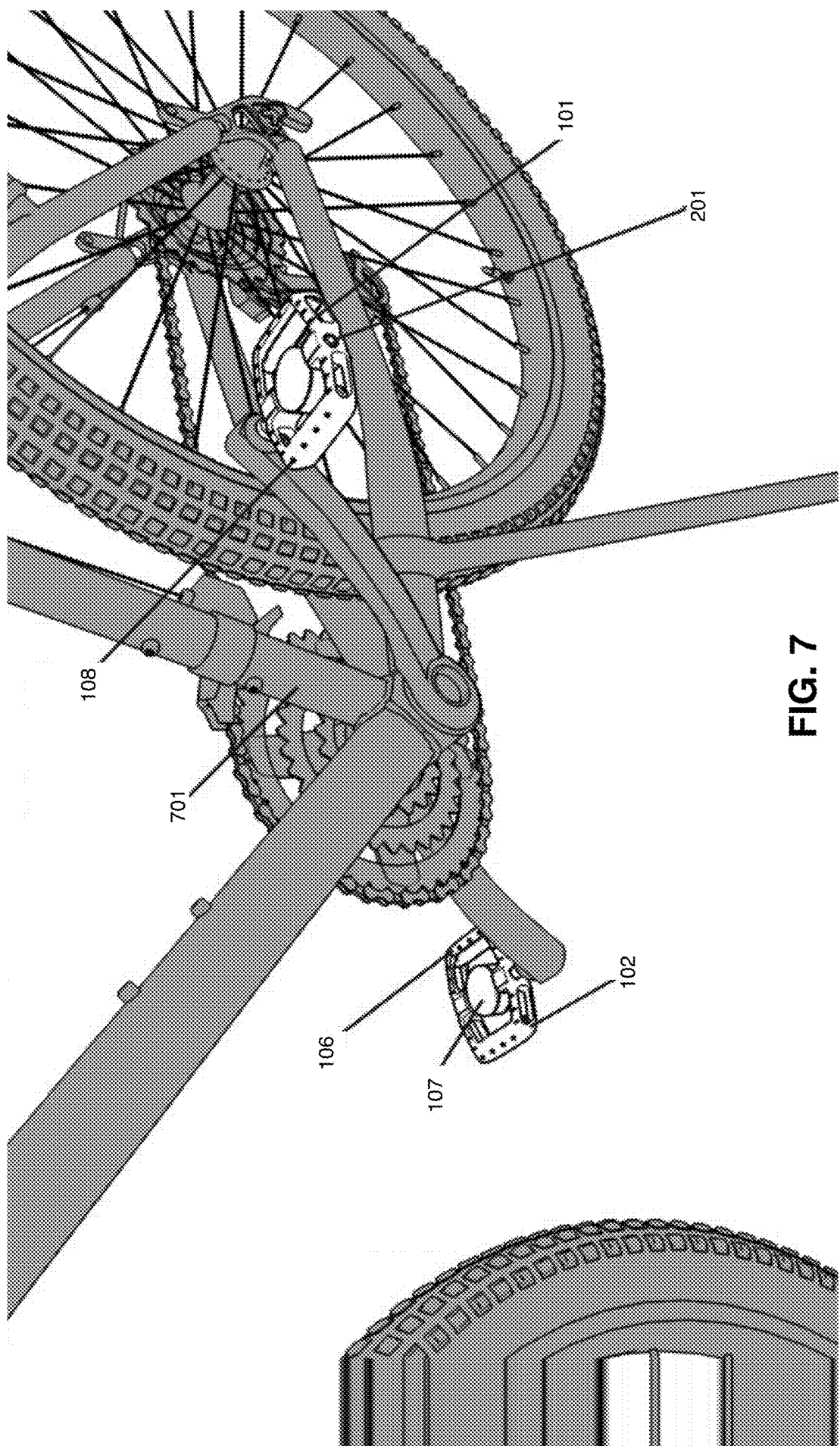
FIG. 7 shows a perspective view of a magnetic mountain bike pedal assembly in accordance with one embodiment of the invention.

Turning attention to FIG. 7, a perspective view of a magnetic mountain bike pedal assembly in accordance with one embodiment of the invention is shown. In the embodiment depicted, a viewer may perceive bike 701, along with hex alloy cad 201, ribs 101, chamfered edges 102, aluminum body 106, Neodymium magnet 107, and adjustable pins 108.

Figure 8:
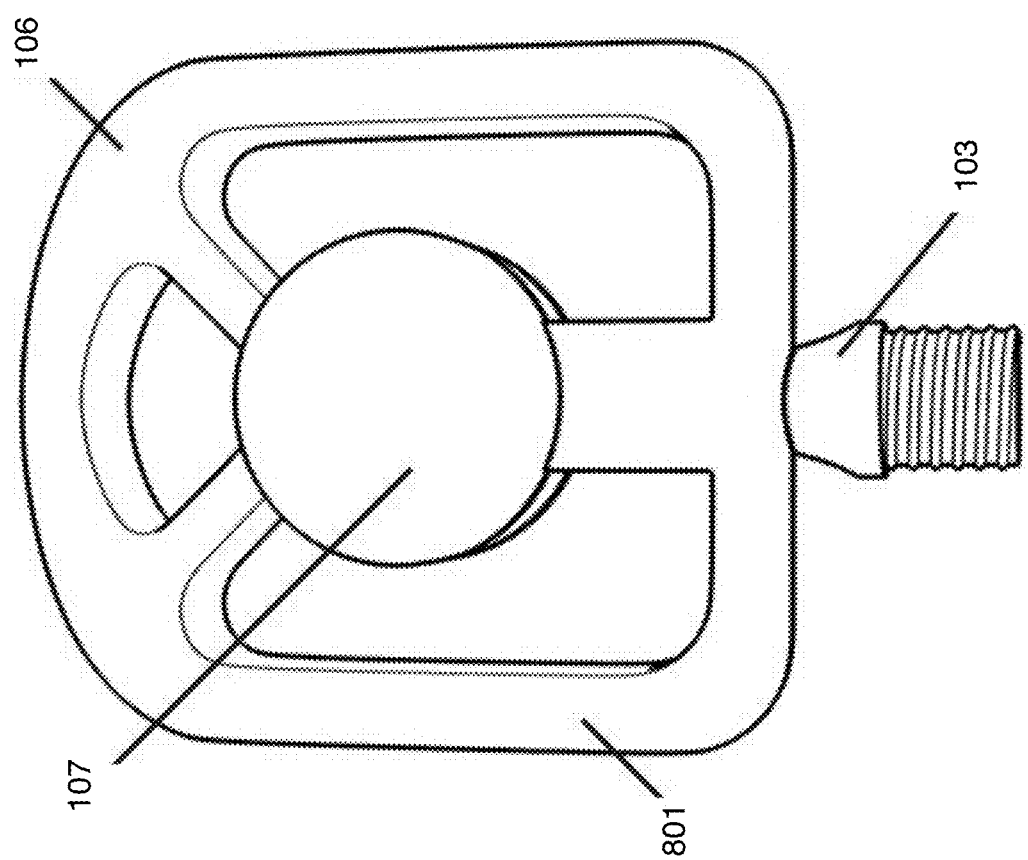
FIG. 8 shows an alternate top-perspective view of a magnetic mountain bike pedal assembly in accordance with one embodiment of the invention.

Turning attention to FIG. 8, an alternate top-perspective view of a magnetic mountain bike pedal assembly in accordance with one embodiment of the invention is shown. In the embodiment depicted, the viewer may perceive second version of pedal 801, along with spindle 103, aluminum body 106, and Neodymium magnet 107.

Figure 9:
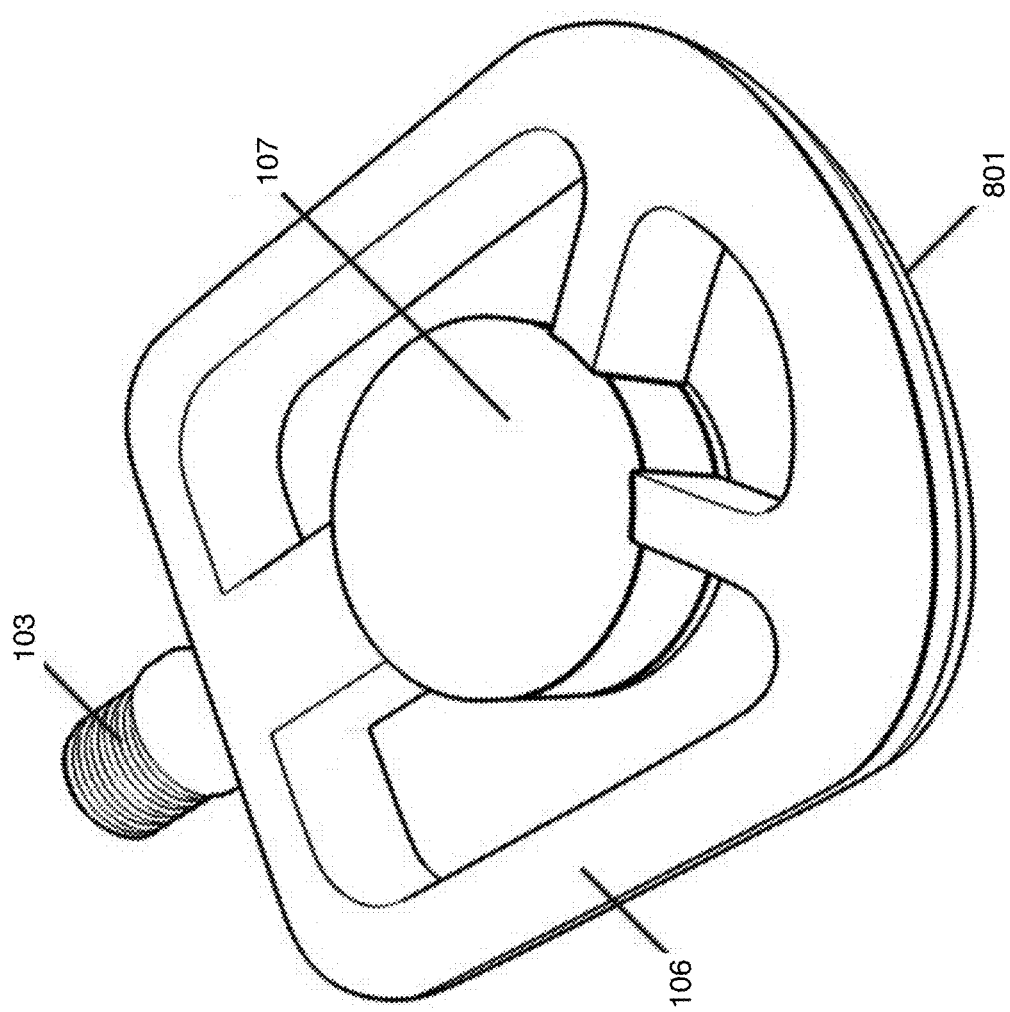
FIG. 9 shows an alternate perspective view of a magnetic mountain bike pedal assembly in accordance with one embodiment of the invention.

Turning attention to FIG. 9, an alternate perspective view of a magnetic mountain bike pedal assembly in accordance with one embodiment of the invention is shown. In the embodiment depicted, the viewer may perceive second version of pedal 801, along with spindle 103, aluminum body 106, and Neodymium magnet 107.

P1. A pedal assembly comprising: a center member 109 having a top side 110, a bottom side 105 (also referred to as a concave platform 105), inside side 111 and an outside side 112, the bottom side 105 having a center portion 113 and an upper surface 114, the inside side 111 having a cavity 115; a cylindrical member 103 (also referred to as a spindle 103) having a first side 504 and a second side 505, the first side 504 configured to rotatably engage with the cavity 115, the second side 505 having threads 502 (also referred to as groove 502); at least one first magnetic element 107; wherein the at least one first magnetic element 107 is fixedly connected to the bottom side's center portion 113 underneath the upper surface 114; a plate element 603 (also referred to as a steel cleat 603) fixedly connected to a shoe 600, the plate element 603 having a center plate portion 604 and an upper plate surface 605; and at least one second magnetic element 606, wherein the at least one second magnetic element 606 is fixedly connected to the center plate portion 604 underneath the upper plate surface 605; wherein when the plate element 603 is positioned above the center portion 1213 the at least one first magnetic element 107 and the at least one second magnetic element 606 are magnetically connected.

P2. The pedal assembly of paragraph P1, wherein the at least one first magnetic element 107 is Neodymium.

P3. The pedal assembly of paragraph P1, wherein the at least one second magnetic element 607 is Neodymium.

P4. The pedal assembly of paragraph P1, wherein the at least one first magnetic element 107 is axially magnetized Neodymium.

P5. The pedal of paragraph P1, wherein the at least one second magnetic element 607 is axially-magnetized Neodymium.

P6. The pedal assembly of paragraph P1, wherein the shoe 600 has at least one ferrous metal cleat.

P7. The pedal of paragraph P1, wherein the at least one first magnetic element 107 is encased in zinc.

P8. The pedal assembly of paragraph P1, wherein the at least one second magnetic element 607 is encased mzmc.

P9. The pedal assembly of paragraph P1, wherein the upper surface 114 is stainless steel.

P10. The pedal assembly of paragraph P1, wherein the upper plate surface 605 is stainless steel.

P11. The pedal assembly of paragraph P1, wherein the upper surface 114 surrounds but does not cover the at least one first magnetic element 107.

P12. The pedal assembly of paragraph P1, wherein the upper plate surface 605 surrounds but does not cover the at least one second magnetic element 607.

P13. A method of using a pedal assembly comprising: providing a center member having a top side, a bottom side, inside side and an outside side, the bottom side having a center portion and an upper surface, the inside side having a cavity; providing a cylindrical member having a first side and a second side, the first side configured to rotatably engage with the cavity, the second side having threads; providing at least one first magnetic element, wherein the at least one first magnetic element is fixedly connected to the bottom side's center portion underneath the upper surf ace; providing a plate element fixedly connected to a shoe, the plate element having a center plate portion and an upper plate surface; providing at least one second magnetic element, wherein the at least one second magnetic element is fixedly connected to the center plate portion underneath the upper plate surface; and positioning the plate element above the center portion, thereby creating a magnetic connection between the at least one first magnetic element and the at least one second magnetic element.

P14. The method of paragraph P13, further comprising: sliding the shoe laterally, thereby disconnecting the magnetic connection.

P15. The method of paragraph P13, wherein the first magnetic element is axially-magnetized Neodymium and the second magnetic element is axially-magnetized Neodymium.

P16. The method of paragraph P13, wherein the shoe has at least one ferrous metal cleat.

P17. The method of paragraph P13, wherein the first magnetic element is encased in zinc.

P18. The method of paragraph P13, wherein the second magnetic element is encased in zinc.

P19. The method of paragraph P13, wherein the upper surface is stainless steel, wherein the upper surface surrounds but does not cover the at least one first magnetic element.

P20. The pedal assembly of paragraph P1, wherein the upper plate surface is stainless steel, wherein the upper place surface surrounds but does not cover the at least one second magnetic element.

CONCLUSIONS, RAMIFICATIONS, AND SCOPE

Although the present invention has been described with a degree of particularity, it is understood that the present disclosure has been made by way of example and that other versions are possible. As various changes could be made in the above description without departing from the scope of the invention, it is intended that all matter contained in the above description or shown in the accompanying drawings shall be illustrative and not used in a limiting sense. The spirit and scope of the appended claims should not be limited to the description of the preferred versions contained in this disclosure.

All features disclosed in the specification, including the claims, abstracts, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function should not be interpreted as a "means" or "step" clause as specified in 35 U.S.C. § 112.

While the magnetic mountain bike pedal assembly generally described herein has been disclosed in connection with a number of embodiments shown and described in detail, various modifications should be readily apparent to those of skill in the art.

What is claimed is:

1. A pedal assembly comprising:
   a pedal body;
   a housing including at least one first magnetic element, the housing is disposed at the center of the pedal body, the housing is formed as a separate feature from the pedal body such that the housing is configured to float;
   wherein the at least one first magnetic element is axially magnetized;
   a spindle having a first side and a second side, the second side having threads, the spindle having a rotation axis, the spindle extends through the pedal body and the center of the housing;
   a plate element fixedly connected to a shoe, the plate element including at least one second magnetic element; and
   wherein when the plate element is positioned above the housing, the at least one first magnetic element and the at least one second magnetic element are magnetically connected.

2. The pedal assembly of claim 1, wherein the at least one first magnetic element is Neodymium.

3. The pedal assembly of claim 1, wherein the at least one second magnetic element is Neodymium.

4. The pedal assembly of claim 1, wherein the at least one first magnetic element includes two magnetic elements, wherein each of the two magnetic elements are disposed on a respective one of opposed sides of the housing.

5. The pedal of claim 1, wherein the at least one second magnetic element is axially-magnetized Neodymium.

6. The pedal assembly of claim 1, wherein the plate element includes at least one ferrous metal cleat.

7. The pedal of claim 1, wherein the at least one first magnetic element is encased in zinc.

8. The pedal assembly of claim 1, wherein the at least one second magnetic element is encased in zinc.

9. The pedal assembly of claim 1, wherein the housing is stainless steel.

10. The pedal assembly of claim 1, wherein the plate element is stainless steel.

11. The pedal assembly of claim 1, wherein the housing surrounds but does not cover the at least one first magnetic element.

12. A method of using a pedal assembly comprising:
    providing a pedal body;
    providing a housing including at least one first magnetic element, the housing is disposed at the center of the pedal body, the housing is formed as a separate feature from the pedal body such that the housing is configured to float;
    wherein the at least one first magnetic element is axially magnetized;
    providing a spindle having a first side and a second side, the second side having threads, the spindle having a rotation axis, the spindle extends through the pedal body and the center of the housing;
    providing a plate element fixedly connected to a shoe, the plate element including at least one second magnetic element; and
    positioning the plate element above the housing thereby creating a magnetic connection between the at least one first magnetic element and the at least one second magnetic element.

13. The method of claim 12, further comprising: sliding the shoe laterally, thereby disconnecting the magnetic connection.

14. The method of claim 12, wherein the at least one first magnetic element is Neodymium and the second magnetic element is axially-magnetized Neodymium.

15. The method of claim 12, wherein the plate element includes at least one ferrous metal cleat.

16. The method of claim 12, wherein the at least one first magnetic element is encased in zinc.

17. The method of claim 12, wherein the at least one second magnetic element is encased in zinc.

18. The method of claim 12, wherein the housing is stainless steel, wherein the housing surrounds but does not cover the at least one first magnetic element.

* * * * *